United States Patent [19]

Kupcikevicius

[11] E Re. 30,791

[45] Reissued Nov. 10, 1981

[54] CANTILEVERED BELTED BAG LOADING APPARATUS

[75] Inventor: Vytautas Kupcikevicius, Chicago, Ill.

[73] Assignee: Union Carbide Corporation, New York, N.Y.

[21] Appl. No.: 74,574

[22] Filed: Sep. 17, 1979

Related U.S. Patent Documents

Reissue of:

[64] Patent No.: 3,942,624
Issued: Mar. 9, 1976
Appl. No.: 345,933
Filed: Mar. 29, 1973

U.S. Applications:

[63] Continuation of Ser. No. 871,980, Jan. 24, 1978, abandoned.

[51] Int. Cl.[3] ..... B65G 43/00

[52] U.S. Cl. ..... 198/341; 198/810; 198/817; 198/857; 198/861; 53/259; 53/391

[58] Field of Search ..... 198/341, 469, 476, 502, 198/780, 810, 817, 857, 860, 861; 193/35 R; 186/2, 3; 53/259, 390, 391, 473, 524

[56] References Cited

U.S. PATENT DOCUMENTS

| | | | |
|---|---|---|---|
| 1,355,488 | 10/1920 | McKenney | 198/37 X |
| 1,787,532 | 1/1931 | Kelly | 271/47 X |
| 2,674,093 | 4/1954 | Slomer | 198/203 X |
| 2,979,186 | 4/1961 | Sehn et al. | 198/37 X |
| 3,626,656 | 12/1971 | Langenscheidt | 53/524 |
| 3,638,390 | 2/1972 | Kupcikevicius | 53/391 |
| 3,648,433 | 3/1972 | Owen | 53/390 |

*Primary Examiner*—Joseph E. Valenza
*Attorney, Agent, or Firm*—Maurice W. Ryan

[57] ABSTRACT

A multiplicity of relatively narrow spaced apart parallel arrayed endless conveyor belts cantilevered from a support frame in the direction of product movement at a bagging station moves individual product articles, one at a time, towards the cantilevered ends of the conveyor belt array. At a predetermined point adjacent the belt cantilevered ends, the moving product article engages and depress is a sensing trigger which stops the belts forward movement to permit sliding a bag of suitable size over the article, with the bag side walls slipped under and between [same] *some* or all of the cantilevered belts supporting the article. Conveyor belt movement is resumed upon a control signal by the bagging station operator and the bagged article is conveyed from the station.

4 Claims, 4 Drawing Figures

CANTILEVERED BELTED BAG LOADING APPARATUS

Figure 1:
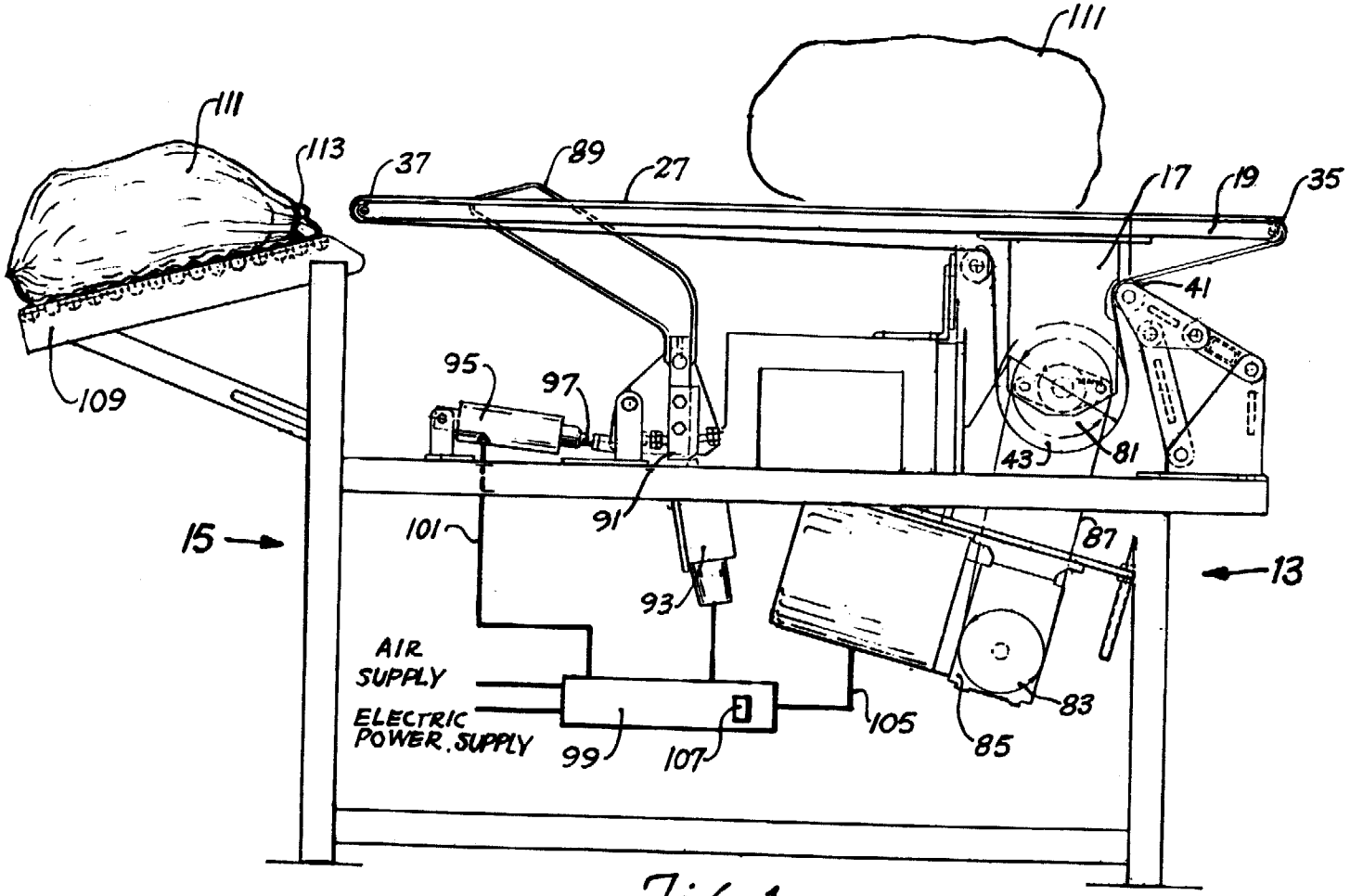

Matter enclosed in heavy brackets [ ] appears in the original patent but forms no part of this reissue specification; matter printed in italics indicates the additions made by reissue.

*This application is a continuation of Ser. No. 871,980 filed Jan. 24, 1978, abandoned.*

This invention relates to a packaging apparatus and method, particularly to the automatic or semiautomatic packaging of product articles, and the more particularly to the bagging of food articles which, in a given series, may vary individually as to size, shape, and weight, such as primal cuts of meat, in flexible bags. Food packaging techniques, particularly the packaging of meat articles, require the maintenance of strict standards of sanitation and the minimizing to whatever extent practicable of human handling of the products or articles being packaged. To the extent that a series of food articles being packaged or bagged at a processing station are relatively alike in size, shape and weight, a higher degree of automation of the packaging process is attainable. Conversely, to the extent that a series of articles being bagged or wrapped are dissimilar in size, shape and weight, the lower the degree of automation possible and the greater the reliance on human apparatus.

Traditionally, the continual bagging of food articles, such as primal meat [and] cuts for instance, which vary in a series as to size, weight, and shape, has been a tedious and time consuming manual operation. Such primal meat cuts may vary in size and weight from about to 8 to about 60 pounds and the bagging of these cuts into the flexible film bags customarily used in such meat packing operations presents problems not encountered in packaging uniform series type articles and not readily or conveniently solved by the application of known [autmation] *automation* techniques. In the simplest and illustrative of conventional packaging or primal meat cuts, the meat articles are delivered one at a time from a feeder conveyor system to a flat topped table or some form of platen where a packaging operator selects a flexible plastic film bag of suitable size from a bag supply magazine, manually opens the bag, inserts the meat cut into the open bag or otherwise wrestles the bag [into] *onto* the article, and then slides the bagged cut off the table or platen onto a removal conveyor means just as the next cut to be bagged is deposited at the bagging station by the feeder conveyor. Some improvements have been achieved over this most elemental system by the use of specially designed bagging racks in place of simple table tops or bagging platens. These racks may provide arrays of support bars or the like over which the bag may be slipped. In practice, however, even with experienced packaging operators, there still occur undesirably high incidences of bag tearing, production line slow downs or stoppages, human contact with the products, and general overall inefficiency. Thus, and essentially because of the very varying nature of the product, no completely satisfactory primal meat cut bagging technique has, prior to the time of the present invention, been available to the industry.

With this as the state of the art, the present invention was conceived and developed to provide a packaging technique for continually bagging, one at a time, individual product articles, which, in a given series, vary as to size, shape and weight.

The invention also provides a bagging technique, apparatus and method which is particularly suitable to packaging primal meat cuts, which may vary in a series in size, shape, and weight, in suitably sized flexible plastic film bags.

A further advantage of the invention is in the provision of a primal meat cut bagging system which minimizes the labor and human to product contact of the packaging station operator by furnishing controllable mechanical assistance in the performance of what were heretofore laborious manual procedures.

Figure 2:
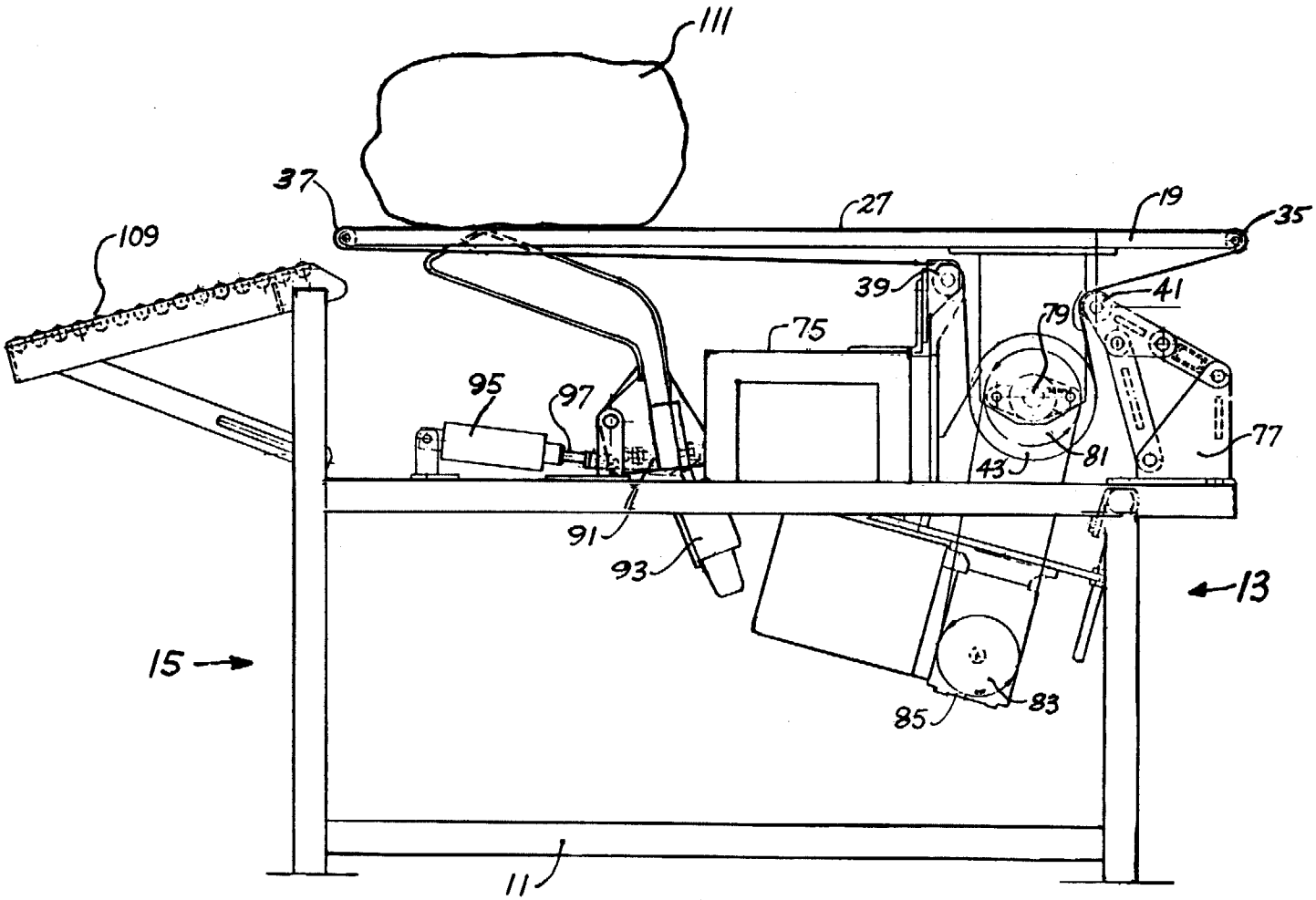
Figure 3:
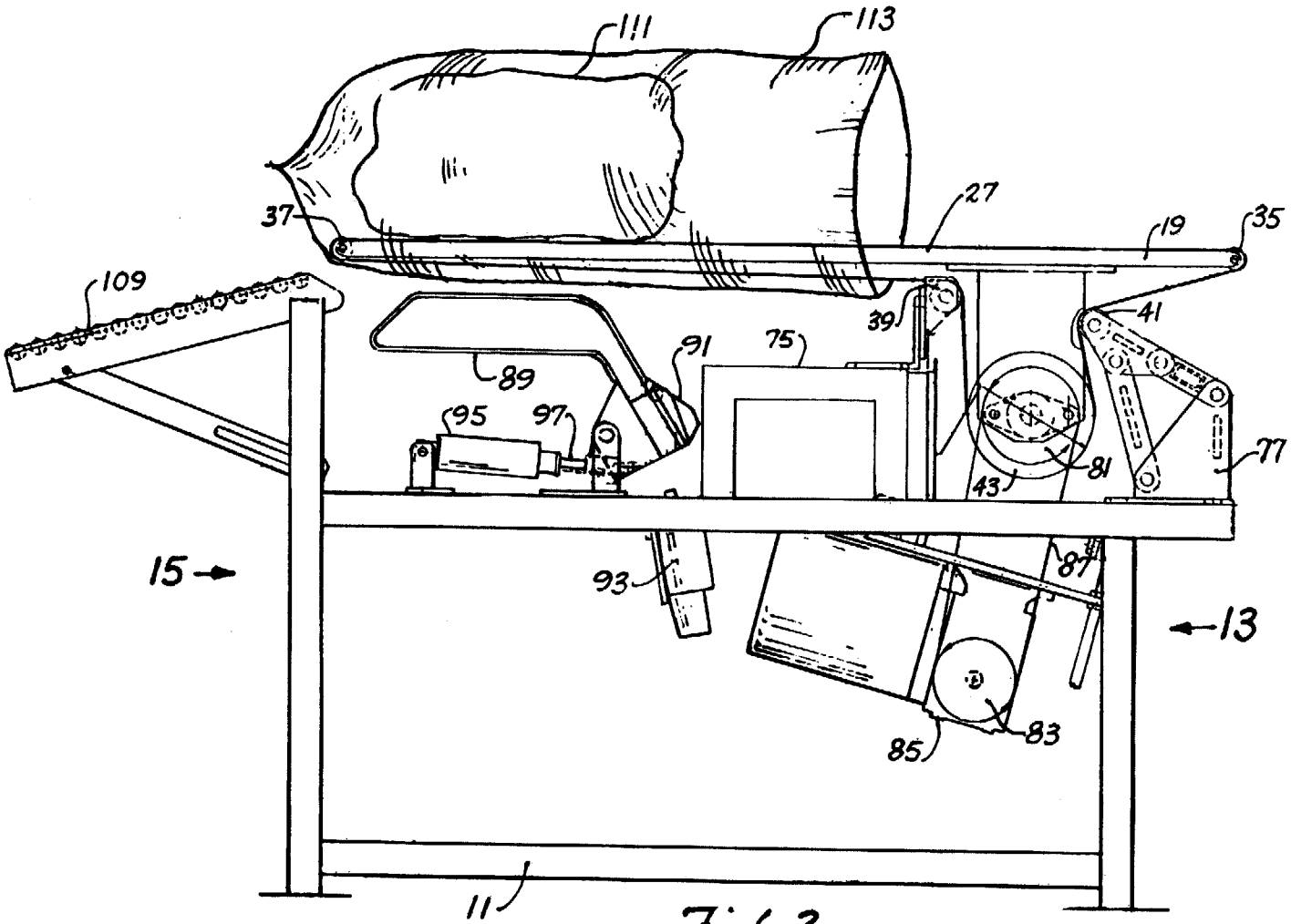
Figure 4:
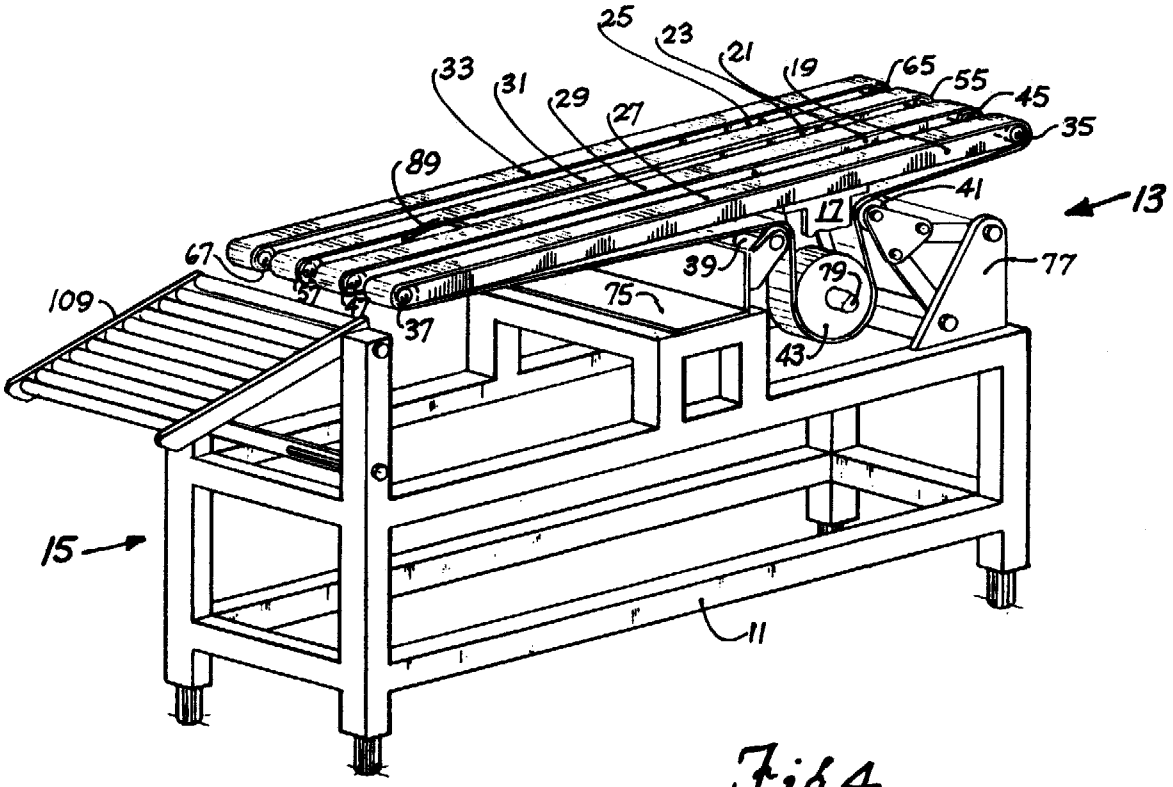

These and other advantages and features of the invention will be the more readily understood and appreciated from the ensuing description and the related appended drawings wherein FIGS. 1 through 3 are side elevational views of apparatus according to the invention illustrating the progressive sequence of an article bagging operation and FIG. 4 is an oblique perspective view of the apparatus of FIGS. 1 through 3.

In general, the present invention comprehends apparatus for conveying and supporting during bagging individual articles in a series of articles being continually bagged comprising, in combination; an apparatus frame having a proximal end and a distal end; a multiplicity of spaced apart parallel arrayed article conveyor means disposed substantially horizontally in alignment with the direction of article progression; a multiplicity of spaced apart parallel arrayed article support means disposed substantially horizontally in alignment with the direction of article progression, each individually subtending one respectively of said multiplicity of conveyor means and each cantilevered towards the distal end of the frame from a fixed support adjacent the proximal end of the frame; motive means operably connected to said conveyor means arranged to advance said conveyor means continuously from the proximal end towards the distal end of the apparatus frame; and control means operable connected to and arranged and disposed to selectably continually activate said motive means.

Certain embodiments of apparatus according to the invention may advantageously include sensing means arranged to detect an article disposed at a preselected location on the conveyor means and signal generating means responsive to said sensing means and operably connected to said control means whereby the presence of an article at said preselected location on the conveyor means is detected by the sensing means and a signal is generated to deactivate said control means.

With reference to the drawings, apparatus according to present invention comprises an apparatus frame 11 designated as having what will for convenience of discussion be called a proximal end 13 and a distal end 15. Frame 11 may be made up of any suitable materials such as, for example, stainless steel structural elements, and is designed to mount a bridge 17 which projects upwardly of the frame and constitutes an anchor point for four elongate parallel arrayed article support members 19, 21, 23, 25. The article support members project from the bridge 17 adjacent the proximal end 13 towards the distal end 15 of the frame in cantilever fashion and also are cantilevered slightly towards the proximal end of the machine from their connection points at the bridge as shown. Each support member is provided with an endless conveyor belt 27, 29, 31, 33 which passes over and rides on suitable pulleys or rollers. The belt 27, for instance, rides on rollers 35 at the proximal end of support 19, roller 37 at the distal end of the support 19, a roller 39, and an idler roller 41. Belt 27 is driven on this array of rollers by a drive pulley 43. In like manner, belt 29 rides on rollers 45, 47, 49, and 51 and is driven by a drive pulley 53; belt 31 rides on rollers 55, 57, 59, 61 and is driven by a drive pulley 63; and belt 33 rides on rollers 65, 67, 69, 71 and is driven by a drive pulley 73. Certain of the rollers, although designated numerically for the purposes of the description, do not appear in the views shown in the drawings but their function and operation will be nonetheless readily understood.

The rollers 39, 49, 59, 69 are mounted on a common shaft extending athwart the apparatus and mounted in a roller support frame 75 fixedly attached to apparatus frame 11. Idler rollers 41, 51, 61, 71 are also mounted on a common shaft extending athwart the apparatus and mounted in an idler roller support frame 77 which is pivotally or otherwise adjustably attached to the apparatus frame 11 adjacent its proximal end 13 and adapted and disposed to swing the idler rollers in and out against the belt surfaces so as to permit belt tensioning adjustment and provide for belt installation and removal.

Drive pulleys 43, 53, 63, 73 are mounted on a common drive shaft 79 which is journaled athwart the apparatus frame. Drive shaft 79 mounts a drive pulley 81 which is rotatably driven by a power take off pulley 83 on a mechanical power source such as a gear motor drive 85. An endless drive belt 87 connects the pulleys 81 and 83. Gear motor drive 85 is shown pivotally suspended and adjustably held on frame 11 to facilitate the installation and removal of drive belt 87.

A sensing element or trigger 89 is arranged to extend upwardly through the space between conveyor belts 29, 31 and related support members 21, 23. The lower end of trigger 89 attaches to a trigger bracket 91 mounted pivotally on frame 11. The trigger 89 and trigger bracket 91 are so arranged and disposed that when the trigger is depressed downwardly as from impingement thereon by an article on the conveyor system, the bracket 91 actuates a sensing device such as pneumatic control relay 93 to provide a signal which stops the conveyor movement. A pneumatic actuator 95 is attached to frame 11 with its actuating shaft 97 connecting to the lower portion of trigger bracket 91 and serves to tilt the entire trigger and trigger bracket assembly down clear of the underside of the cantilevered conveyor belts and their supports at the proper times to facilitate the bagging step. FIG. 3 of the drawings shows the apparatus with the actuator 95 energized, its shaft 97 extended and the trigger and trigger bracket assembly tilted down clear of the underside of the cantilevered conveyor system.

FIG. 1 schematically shows a control system arrangement which includes a control panel or station 99 which may be provided with an air supply and an electric power supply. From the control station 99 as shown in FIG. 1, a pneumatic actuating conduit 101 extends to the actuator 95, a pneumatic control conduit 103 to the relay 93, and an electric power circuit 105 to the gear motor drive 85. The control station 99 contains pneumatic, electrical and electro-pneumatic relays, switches and other components arranged and interconnected in a manner well within the ken of persons familiar with control systems design, to produce the control effects and requirements of the present invention. The control system of the illustrated embodiment will be more fully explained and understood from the ensuing description of the operation of the apparatus.

The embodiment of apparatus illustrated in the drawings also shows gravity roller conveyor assembly 109 depending from the distal end of the frame. This element is not part of the invention, but is included to facilitate the description of the operational sequence.

FIG. 1 shows the start of an operational sequence with a meat article 111 which has just been deposited on the conveyor at the proximal end 13 of the machine and is being conveyed towards the distal end 15 thereof. At the left of FIG. 1, a bagged article which has just been conveyed off the cantilievered ends of the moving conveyor system, is shown on the gravity conveyor assembly 109.

In FIG. 2, the meat article 111 has progressed to a point adjacent the distal end 15 and is out on the cantilevered portions of the belt conveyors and their related supports. By the time it has arrived at or near this location, article 111 will have engaged and depressed the sensing trigger 89 to the condition shown, causing the frame 91 to tilt sufficiently to actuate the pneumatic sensing device 93. This action transmits a pneumatic signal through pneumatic control conduit 103 to control station 99 which translates the signal into a first signal which effects electric power cut off to the gear motor drive 83, stopping the conveyor movement after a suitable time delay, and a second signal which effects transmission of a pneumatic actuating signal to the pneumatic actuator 95, which thereupon extends its shaft 97 and tilts the entire trigger and trigger bracket assembly down clear of the underside of the cantilevered conveyor array to the position shown in FIG. 3. The meat article 11 is now at rest at the cantilevered end of the conveyor array and a bag 113 is readily and easily slipped over the article and, according to the particular article size, some or all of the conveyor belts and their related supports. The spaces between the spaced apart conveyor assemblies permit the selection of various suitably sized bags to accommodate varying article sizes.

When the bag is on the article as shown in FIG. 3, the operator closes the restart-overrun switch 107 on control station 99 which causes resumption of conveyor movement and, when the bagged article is clear of the apparatus, return of the trigger and trigger bracket assembly to the position shown in FIG. 1.

It is also possible if found desirable in certain packaging operations, to override the intermittent stopping action hereinabove described and to bag the articles on the move, significantly increasing production. Accordingly, the control system may advantageously provide for by-passing the triggered stop sequence when the restart-override switch 107 is kept closed or depressed. Switch 107, it has also been found, may advantageously be a foot or knee bar actuated switch, leaving the packaging operator with both hands free.

Although the invention has been described in detail and with reference to the drawings, in respect of an illustrative working embodiment of apparatus, there are alternative modes, apparatus embodiments, and components thereof which are also properly within the ambit of the present inventive concept. It is possible for instance to use an array of narrow paralleled roller conveyor sets in place of the belt conveyors and their supports hereinbefore described. In such an embodiment, the motive power source and related controls and power supplies may be eliminated, the apparatus utilizing the forward inertia of the article deposited from whatever feed system is used to traverse the bagging station to the cantilever supported position for the actual bagging step and requiring only simple manual pushing off the apparatus to the removal conveyor for instance.

The power sources may also vary and include electrical, pneumatic, hydraulic and other sources as well as combination of these.

Other alternative modes and apparatus embodiments will, in light of this disclosure, undoubtedly occur to persons familiar with the art. It is intended therefore that the foregoing description be taken as illustrative only and not construed in any limiting sense.

What is claimed is:

[1. Apparatus for conveying and supporting during bagging individual articles in a series of articles being continually bagged comprising, in combination;

an apparatus frame having a proximal end and a distal end;

a multiplicity of unconnectedly spaced apart parallel arrayed article conveyor means disposed substantially horizontally in alignment with the direction of article progression.

a multiplicity of spaced apart parallel arrayed article support means disposed substantially horizontally in alignment with the direction of article progression, each individually subtending one respectively of said multiplicity of conveyor means and each contilevered towards the distal end of the frame from a fixed support adjacent the proximal end of the frame;

motive means operably connected to said conveyor means arranged to advance said conveyor means continuously from the proximal end towards the distal end of the apparatus frame; and control means operably connected to and arranged and disposed to selectably continually activate said motive means.]

2. Apparatus according to *either* claim [1] *7 or 8* in combination with sensing means arranged to detect [an] *a meat* article disposed at a preselected location on the conveyor means and signal generating means responsive to said sensing means and operably connected to said control means whereby the presence of [an] *a meat* article at said preselected location on the conveyor means is detected by the sensing means and a signal is generated to deactivate said control means.

3. Apparatus according to *either* claim [1] *7 or 8* wherein the conveyor means comprises a multiplicity of individual endless conveyor belts.

[4. Apparatus according to claim 1 wherein the motive means and the control means are pneumatic means.]

[5. Apparatus for conveying and supporting during bagging individual articles in a series of articles being continually bagged comprising, in combination; an apparatus frame having a proximal end and a distal end; and a multiplicity of spaced apart parallel arrayed article conveyor means disposed in alignment with the direction of article progression each cantilevered towards the distal end of the frame from a fixed support attached to and adjacent the proximal end of the frame.]

[6. Apparatus according to claim 5 wherein each of said conveyor means is a roller conveyor.]

*7. Apparatus for bagging meat articles of varying sizes, shapes and weights in suitably sized flexible plastic film bags at a bagging station, which apparatus substantially reduces manual handling of the meat articles, minimizes bruising thereof and does not require adjustment or alteration of the apparatus during the bagging operation when meat articles of varying sizes, shapes and weights are being bagged, said apparatus comprising, in combination;*

*a support means;*

*a multiplicity of parallel arrayed conveyor belt supports mounted substantially horizontally on said support means in cantilevered relationship thereto and extending lengthwise from a first end whereat meat articles are received to a second end whereat meat articles are discharged, at least said second end being located at a cantilevered end of said belt supports;*

*conveyor means comprising substantially flat conveyor belts, each moveably mounted on said conveyor belt support for movement lengthwise over the upper and lower sides of said supports, the outer surfaces of said belts being entirely above the belt supports when said belts pass over the upper sides of said supports, the conveyor belts and their respective belt supports being arranged so that the meat articles during conveying and bagging do not contact the belt supports and said conveyor belts being aligned so as to provide a substantially flat meat contacting surface above said supports from transporting the meat articles from the first end to the second end;*

*a bagging zone located at said meat contacting surface adjacent to the second end,*

*each conveyor belt and its respective support being spaced laterally apart in fixed relationship from each adjacent conveyor belt and its respective support in said bagging zone, the spaces between adjacent conveyor belts and their respective supports at the bagging zone being large enough to permit passage of a bag wall thereinto and thereby a selective placement of bags of varying widths over one or more of said conveyor belts and their respective supports at the bagging zone; the space above said meat contacting surface in the bagging zone being unobstructed and open to accommodate meat articles of varying heights in the bagging zone and to permit the selective placement of bags of rying sizes over such meat articles when meat articles are positioned on said meat contacting surface in the bagging zone; whereby a bag suitably sized to accommodate the meat article to be bagged may be placed over the meat article and some or all of the conveyor belts and their respective supports, and meat articles of varying size, shape and weight may be readily and easily bagged at a single bagging station;*

*motive means operably connected to said conveyor means arranged to move said conveyor means; and*

*control means operably connected to said motive means.*

*8. Apparatus for bagging meat articles of varying sizes, shapes and weights in suitably sized flexible plastic film bags at a bagging station, which apparatus substantially reduces manual handling of the meat articles and does not require adjustment or alteration of the apparatus during the bagging operation, said apparatus comprising, in combination;*

*a frame having a proximal end and a distal end;*

*conveyor means extending lengthwise from the proximal end to the distal end of said frame, said conveyor*

*means including a multiplicity of parallel arrayed conveyor belts spaced laterally apart in fixed relation to each other, said conveyor belts each having meat article contact surfaces for transporting the meat articles from the proximal end to the distal end of said frame and being aligned to provide a substantially flat meat contacting surface;*

*a multiplicity of parallel arrayed supports mounted substantially horizontally on said frame, one respectively for each conveyor belt, in alignment with the direction of article progress and spaced laterally apart in fixed relationship to each other, each support for each respective conveyor belt being disposed entirely below the meat contact surface of each conveyor belt, the conveyor belts and their respective belt supports being arranged so that the meat article during conveying and bagging does not contact the belt supports and the meat article is supported and conveyed at its lowermost surface solely by the meat article contact surface of said conveyor belts and each support cantilevered*

*towards the distal end of the frame from a support adjacent to the proximal end of the frame;*

*each conveyor belt and its respective support being spaced from each adjacent conveyor belt and its respective support at the cantilevered portion of said conveyor supports, the space between adjacent conveyor belts being large enough to permit at least a portion of a bag to be placed therein and the space above the substantially flat meat contacting surface being unobstructed and open, so that a bag suitably sized to accommodate meat articles of varying sizes, shapes and weights may be placed over the meat article and some or all of the conveyor belts and their respective supports, whereby meat articles of varying sizes, shapes and weights may be readily and easily bagged at the bagging station;*

*motive means operably connected to said conveyor means arranged to advance the conveyor means from the proximal end to the distal end of the frame; and*

*control means operably connected to said motive means.*

* * * * *

UNITED STATES PATENT AND TRADEMARK OFFICE

CERTIFICATE OF CORRECTION

PATENT NO. : RE 30,791
DATED : November 10, 1981
INVENTOR(S) : Vytautas Kupcikevicius It is certified that error appears in the above—identified patent and that said Letters Patent is hereby corrected as shown below:

IN THE ABSTRACT Line 8, "depress is" should read --depresses--.

Column 1, Line 42, "or" at the end of the line, should read --of--.

Claim 7, at column 6, line 30, "from" should read --for--.

Signed and Sealed this

*Twenty-seventh* Day of *April 1982*

[SEAL]

*Attest:*

GERALD J. MOSSINGHOFF

*Attesting Officer*

*Commissioner of Patents and Trademarks*